Feb. 26, 1946.　　　　E. W. BEREIT　　　　2,395,391
WORK TUMBLING CONVEYER MECHANISM
Filed Jan. 27, 1944　　　5 Sheets-Sheet 1

INVENTOR.
EDWIN W. BEREIT.
BY Fay, Gobrick, Chilton & Isler.
Attorneys.

Feb. 26, 1946. E. W. BEREIT 2,395,391
WORK TUMBLING CONVEYER MECHANISM
Filed Jan. 27, 1944 5 Sheets-Sheet 2

INVENTOR.
EDWIN W. BEREIT.
BY Fay, Gobrick, Chilton & Isler.
Attorneys.

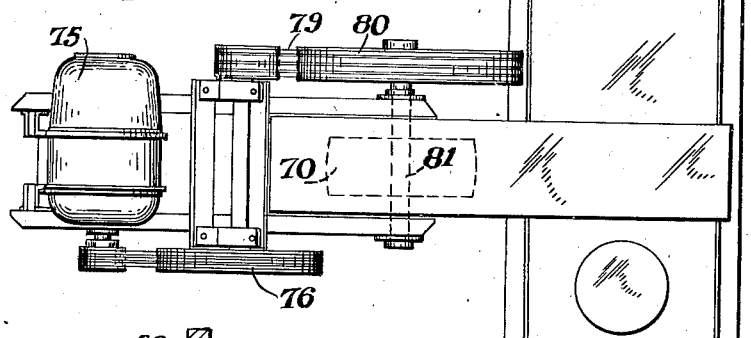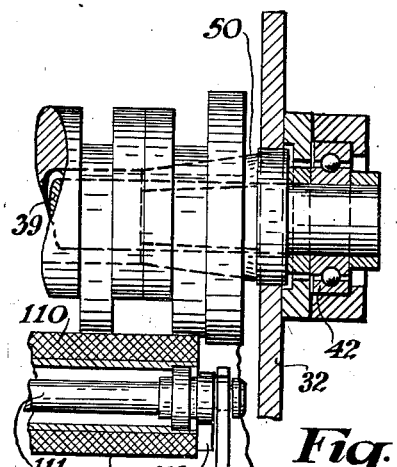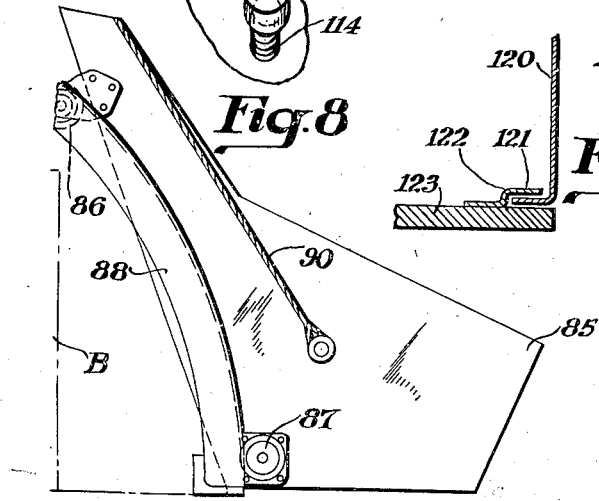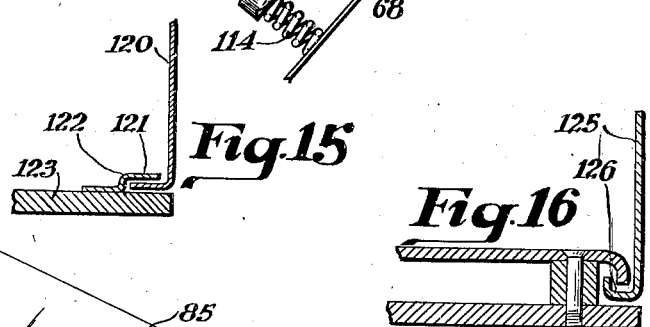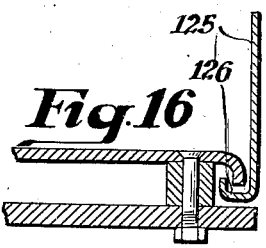

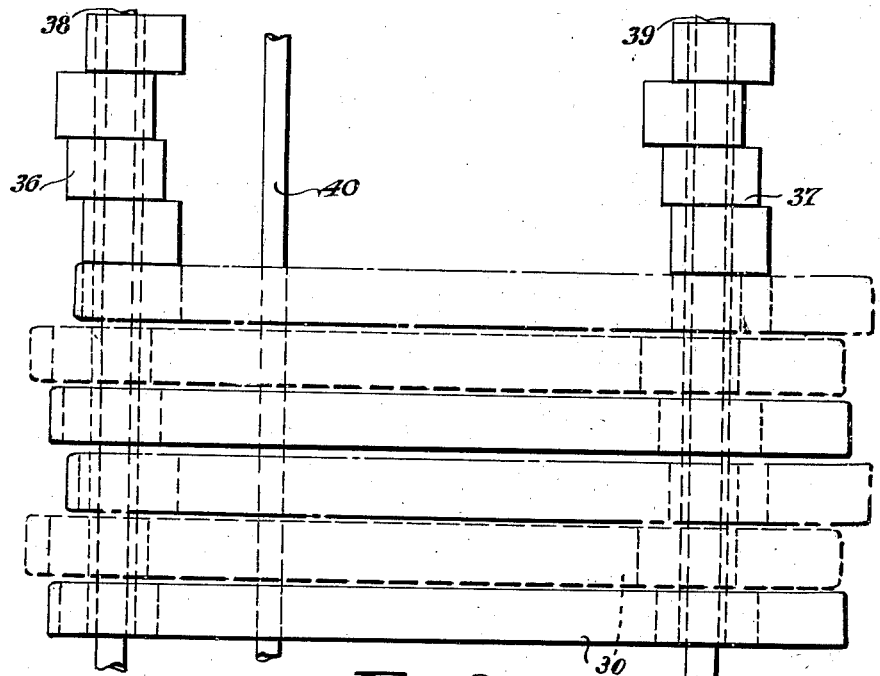
Fig. 6
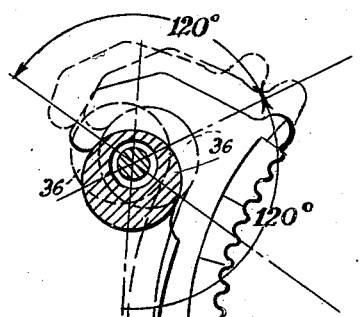
Fig. 7
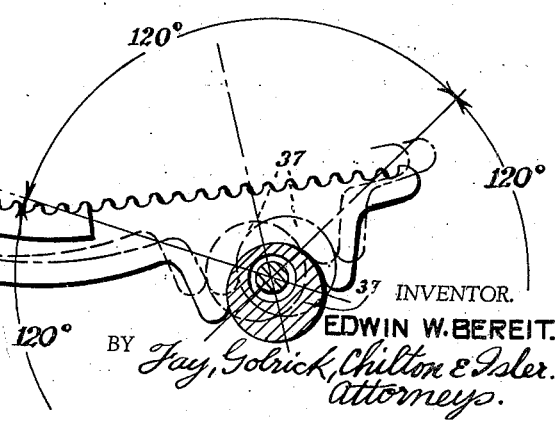

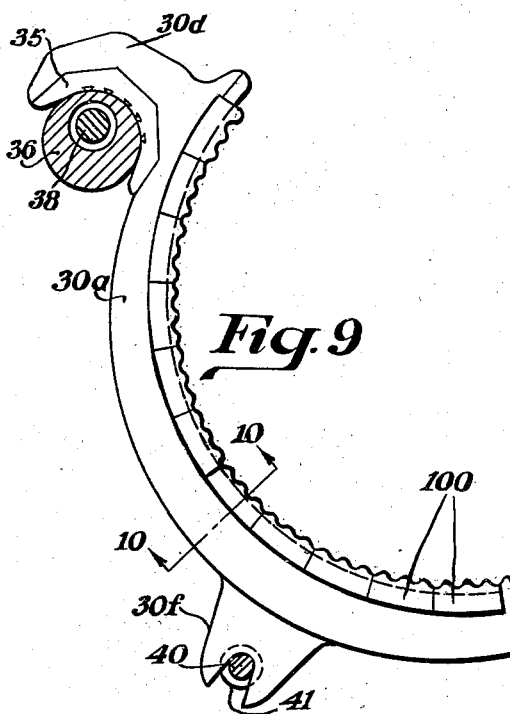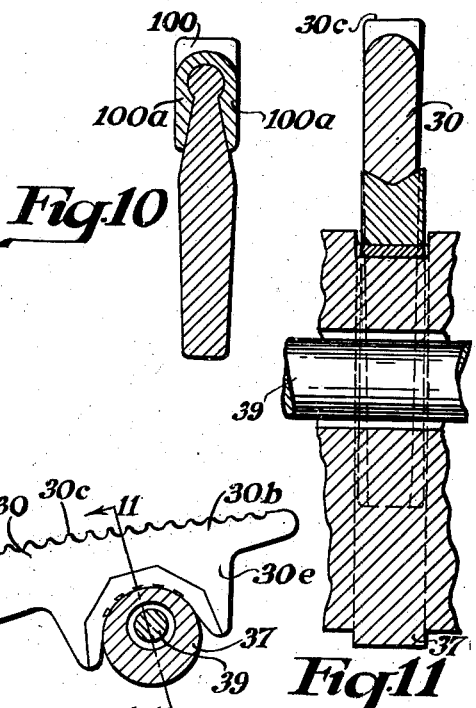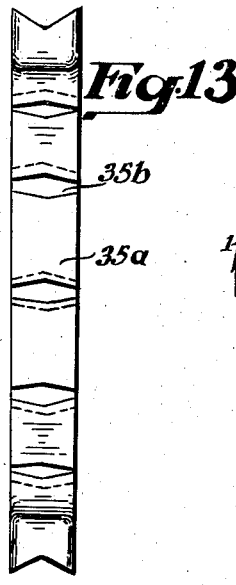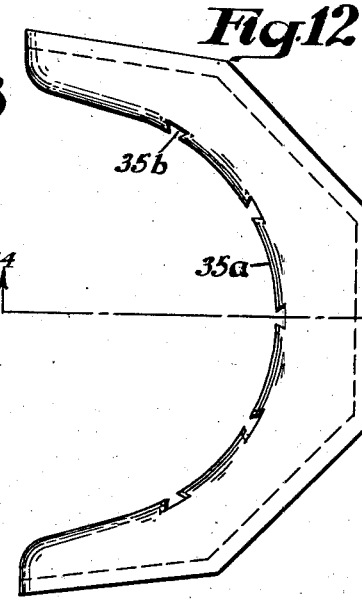

Patented Feb. 26, 1946

2,395,391

UNITED STATES PATENT OFFICE 2,395,391

WORK TUMBLING CONVEYER MECHANISM

Edwin W. Bereit, Cleveland, Ohio, assignor to The W. W. Sly Manufacturing Company, Cleveland, Ohio, a corporation of Ohio Application January 27, 1944, Serial No. 519,938

11 Claims. (Cl. 51—163)

The general object of the invention is the provision of a novel tumbling conveyer mechanism which is utilizable for a variety of purposes, such as the conveying while agitating masses of workpieces in or through treatment zones, such as drying, plating, cleaning or heating operations and any operations wherein or during which it is desired to maintain a continuous relative agitation of the individual workpieces to expose all of the surfaces thereof at some time or point during the treatment of the workpieces.

Another object of the present invention is the provision of an apparatus having the foregoing stated utility and which is reversible in its workpiece conveying action so that a reversed action of the apparatus will discharge the treated workpieces from the apparatus.

A still further object of the present invention is the provision of a novel blasting mill structure which embodies the foregoing referred to invention.

To the accomplishment of the foregoing and related ends, said invention, then, consists of the means hereinafter fully described and particularly pointed out in the claim; the annexed drawings and the following description setting forth in detail certain mechanism embodying the invention, such disclosed means constituting, however, but one of various mechanical forms in which the principle of the invention may be used.

In said annexed drawings:

Fig. 3 is a top plan view of an abrasive conveyer drive forming a part of the present invention;

Fig. 4 is an enlarged cross-sectional detail of the tumbling conveyer actuating means when taken substantially along the line 4—4 of Fig. 2;

Fig. 5 is an end view of the mechanism shown in Fig. 4;

Figs. 6 and 7 are detailed demarcations of the workpiece conveying movements of the work tumbling and conveying mechanism;

Fig. 8 is a side elevation of a skip hoist means for charging work into the tumbling conveyer mechanism;

Fig. 9 is an enlarged side elevation of one of a series of movable bars comprising the conveyer mechanism and the associated actuating means therefor;

Fig. 10 is an enlarged cross-sectional view of the bar structure shown in Fig. 9 and taken substantially along the line 10—10 of Fig. 9;

Fig. 11 is a similar cross-sectional view taken substantially along the line 11—11 of Fig. 9;

Fig. 12 is an enlarged side view of a bearing member comprising part of the bar mechanism shown in Fig. 9;

Fig. 13 is a front view of the bearing member shown in Fig. 12;

Figure 1:
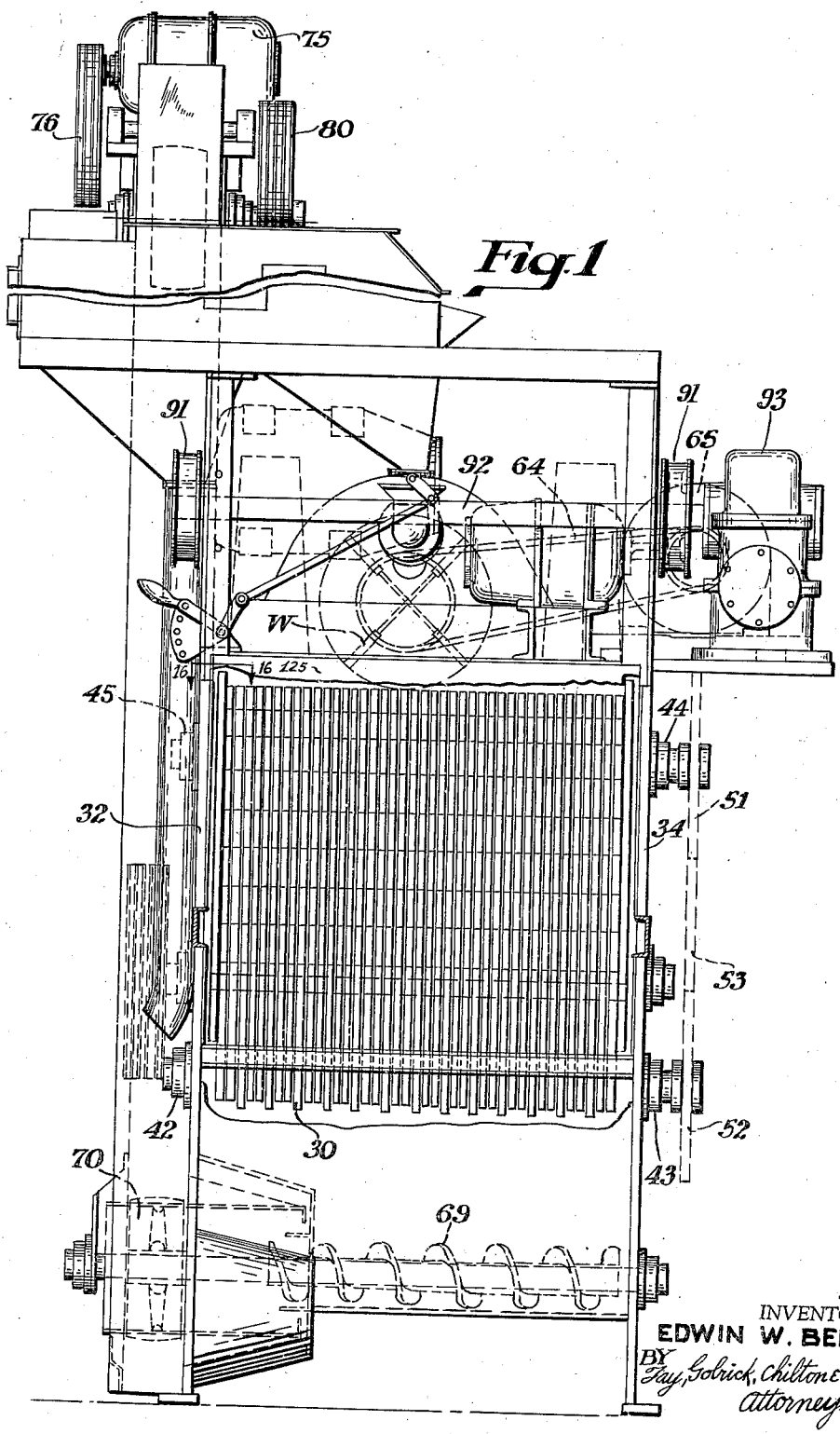
Fig. 1 is a front elevation of an embodiment of my invention as incorporated in a blasting mill.

Fig. 14 is a cross-sectional enlargement of the bearing member shown in Fig. 12 and shown substantially along the line 14—14 of Fig. 12; and Figs. 15 and 16 are cross-sectional details of the housing structure and taken substantially along the lines 15—15 and 16—16 of Fig. 1.

Various work tumbling conveyer mechanisms have been proposed and some of them used which incorporated the use of endless chain or endless belt arrangements that necessitated engineering considerations as to the weight of the movable parts of the conveyer, rapid depreciation of the conveyer parts and bulky design. I propose to avoid these and other disadvantages by constructing a conveyer mechanism wherein the movement of the work carrying and work tumbling or agitating elements is reduced to a minimum. In the particular embodiment of the invention set forth in the drawings I disclose the same as being utilized as a tumbling conveyer mechanism in a blasting mill. It will be understood by those skilled in the art that the tumbling conveyer mechanism can be adapted to other uses, and that the present embodiment is for the purpose of showing one use of the novel work tumbling and conveying mechanism. I have illustrated the invention as being incorporated in and part of a blasting mill of the centrifugal abrasive throwing type, although it will be understood by those skilled in the art that the invention is not limited to use in combination with a blasting mill.

The tumbling conveyer mechanism comprises series or sets of oscillating bars having both substantially horizontal and substantially vertical portions or reaches, the general shape of the bars being curvilinear, whereby when the workpieces are conveyed or urged to a piled up condition the workpiece will be caused to fold or cascade backward. In the embodiment disclosed herein three sets of such bars are combined in such cooperative relationship that each set of bars has a reciprocating and rising and falling motion sequent and relative to each other. The bars are arranged in close parallelism to form a grid or conveyer surface as will be observed in Fig. 1, and whereby the upper surfaces of the bars in effect comprise a work supporting bed. The action of the bars upon the workpieces is such that a step by step progression of the workpieces is effected across the bed and as the workpieces are thus caused to move over the surface of the bed they pile up to a point beyond the angle of repose whereby cascading or a backward tumbling of the workpieces will be effected constantly in the zone of the abrasive blast.

Figure 2:
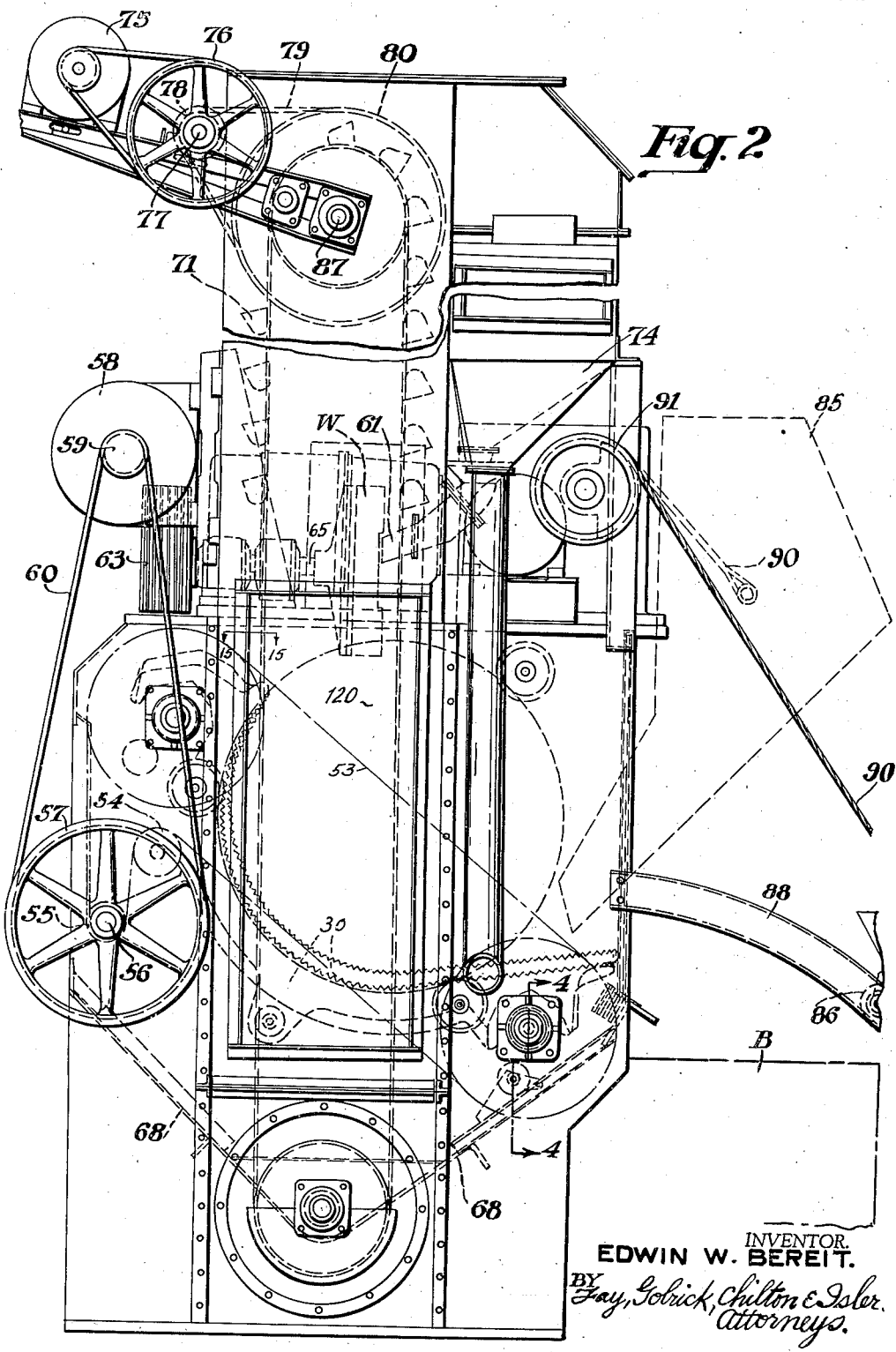
Fig. 2 is a side elevation of such a blasting mill.

Referring particularly to Figs. 1 and 2 of the drawings, I show generally an enclosed blasting mechanism comprising a tumbler conveyer mechanism formed by a series of parallel extending movable bars 30 which are arranged to extend from side wall 32 to side wall 34 of the housing structure with only sufficient space between the bars to permit the downward passage of abrasive particles and foreign matter removed from the workpieces during the blast cleaning operation.

Referring to Figs. 6, 7 and 9 it will be seen that the bars 30 are formed to have a substantially vertical reach or vertically extending portion 30$^a$ and a substantially horizontally extending portion 30$^b$. The top or work engaging surface of each bar is provided with corrugations 30$^c$ which have a threading action upon the workpieces. Each bar has integrally formed thereon near the upper end thereof a bearing bracket portion 30$^d$ and a like bracket portion 30$^e$ near the lower end thereof. These bracket portions are shaped to receive and retain bearing shoes 35. The bearing shoes 35 ride upon cam members 36 and 37, which in the present instance may be eccentrics formed on a tubular structure coaxially mounted relative to supporting shaft members 38 and 39. In the instant disclosure there are three sets of bars and three sets of cam formations, one set of bars being held in the form of a frame by a tierod 40 and spacer sleeves 41, which clampingly engage lugs 30$^f$ formed upon and extending downwardly from each third bar of the grid structure. All of the cam members 36, 37 engaging the bars in this particular set or series of bars are disposed at the same position relative to each other and to the shafts 38 and 39 respectively. The intermediate bars, as shown in Figs. 6 and 7, are of substantially the same construction as the construction of the bar shown in Fig. 9, with the exception that the intermediate bars are not tied together with a tierod and spacer sleeves, but merely rest upon their eccentrics or cam members and all of which are of the same shape and size as the cam members 36 and 37, but which are spaced with the high points thereof 120° apart, as indicated by the dot and dash lines in Fig. 5.

The shafts 38 and 39 are driven in unison in a manner to be described and are supported upon suitable bearing members 42, 43, 44 and 45, respectively. These bearing members (see Fig. 4) are secured to and supported by the side wall structures 32, 34 of the mill housing structure. It will be noted in Fig. 4 that the cam members are shown as being formed out of a solid hollow bar aligned on shafts 38 and 39 by cone-shaped members 50 fixed upon the shafts 38, 39. Outer ends of the shafts 38 and 39 extend outwardly beyond the bearing structures and carry sprockets 51 and 52 which are driven by a chain 53.

The chain 53 extends over an idler 54 supported on the housing to a driving sprocket 55 carried on a shaft 56. The shaft 56 is suitably supported by bearing structures attached to the housing walls and extends from one side to the opposite side of the housing. The shaft 56 is driven by a pulley 57 and the pulley 57 is driven by a reversible motor 58, the sheave 59 of which drives belt 60 extending over the pulley 57. The control of the motor 58 may be such that the motor can be reversed, whereby the direction of rotation of the cam shafts 38 and 39 can be reversed and the motion of the bars is such that the conveying action upon the workpieces will be reversed. The speed of the motor can also be varied if desired and in a well-known manner.

Mounted above the conveyer bed is a centrifugal blasting mechanism comprising an abrasive throwing wheel W, driven in any convenient manner and arranged to receive abrasive from a feed chute 61 and blast the same downwardly in the direction of the workpieces on the grid bed of the tumbling conveyer mechanism above described. The blasting wheel W is mounted upon a shaft 62 supported by suitable bearing mechanisms attached to the housing structure. Pulley 63 and shaft 62 are driven by a belt 64 which is driven by a motor 65.

The drawings illustrate a hopper structure 68 extending beneath the tumbling conveyer mechanism within the housing to receive the falling abrasive and a screw conveyer 69 is provided in the bottom of the hopper structure for conveying the recovered abrasive to one side of the housing to the well of a vertically extending bucket conveyer belt mechanism 70 comprising a series of buckets 71, which carry the abrasive upwardly to the top of the housing where the same may be discharged into an abrasive cleaning mechanism, or directly to the abrasive feeding hopper 74. Mounted at the top of the housing is a motor 75 driving a pulley 76 on a shaft 77 for driving the bucket conveyer. The shaft 77 carries a pulley 78 which drives a belt 79 extending over a pulley 80 mounted upon the bucket conveyer shaft 81 whereby the bucket conveyer mechanism can be driven independently of operation of the blasting mill or the tumbling conveyer mechanism. It will be noted that the screw conveyer 69 supports the bottom sprockets of the bucket conveyer and is driven by the bucket conveyer.

Disposed at the front of the blasting mill I show a skip hoist mechanism comprising a work receiving bucket or scoop 85 provided with rollers 86 and 87 engaging arcuately formed channel members 88 disposed at the sides of the bucket. Cables 90 extend upwardly around the drums 91 mounted on a shaft 92, which may be power driven through reduction gearing mechanism, generally indicated by the reference numeral 93, to cause the work hoist bucket 85 to be swung upwardly to the position shown in the dotted position shown in Fig. 2, to thus cause an elevating and tilting of the bucket and a consequent discharge of the workpieces therefrom on to the forwardly disposed portions of the conveyer bars. When it is desired to remove the workpieces from the mill the motion of the bars is reversed as described and the workpieces may be discharged into a crate or tray disposed immediately beneath the front ends of the bars.

In Figs. 9, 10 and 11 I have illustrated a particular type of bar construction for use in blasting mills where considerable wear and depreciation of the bars takes place due to the blasting effect of the abrasive thereon, the purpose of the structure being to permit renewal of the rapidly wearable upper portions of the bars without necessitating the discarding of the entire bar structure. The arrangement may be in the form of a series of shoes 100 formed of a suitable wear-resisting material. As shown in Fig. 10 the top of the bar is reduced in cross-section to provide a rounded rib formation which can be slidably embraced by the sides 100ª of the shoe structure which have the internal surfaces thereof complementarily formed relative to the rib shape of the bar. As shown in Fig. 9, the shoes are disposed on the bars in only those regions where the maximum blasting or abrasive wearing effect takes place.

Also, when the tumbling conveying mechanism is to be used in a blasting mill the bar bearing shoes 35 have the bearing surfaces 35ª thereof provided with dove-tail shaped notches 35ᵇ for the reception of anti-friction bearing material. To further prevent the abrasive action of the abrasive dust of the mill between the bearing shoes and the cam surfaces I provide a lubricating roll 110. This roll may be carried by a floating shaft 111 supported by a pair of lever members 112 pivotally connected at one end of brackets 113 secured to a panel of the hopper structure 65. Spring members 114 are disposed between the free ends of the lever members 112 and the hopper wall to urge the lubricating roll 110 into constant engagement with the surfaces of the cam members as the same revolve thereagainst. The composition of this lubricating roll may comprise graphite and wax treated fabric wound to form a roll. It is to be understood that a like arrangement may be provided for the application of lubricant to the upper set of cam members.

In the foregoing description the various mechanisms directed to the handling of the cleaning abrasive have been described only in a cursory manner since it will be understood by those skilled in the art that the work tumbling and conveying mechanism, more particularly described, can be incorporated in various cleaning mill housing structures in such convenient manner that all of the parts thereof may be readily accessible and easily removable. I have shown, for example, in Figs. 15 and 16 a few details of the housing structure; Fig. 15 being a cross-sectional detail through an inspection door such as is generally indicated in front elevation in Fig. 2, the door 120 being provided with side flanges 121 extending into frame members 123 secured to the side wall structure 32 of the housing structure. In Fig. 16 the loading door 125 is provided with similar flanges 126 extending into members of the front wall structure of the housing to afford a dust seal when the apparatus is in operation. Many other details of structure are indicated in the drawings but not described since the same form no part of the present invention.

The operation of the machine is as follows: The workpieces are deposited in the lowered skip hoist bucket 85; the door 125 is elevated; the winding shaft 92 is actuated through reduction gearing 93 to cause cables 90 to be wound upon the drums 91 whereupon the skip hoist is elevated from the position shown in Fig. 8 to the dotted line position shown in Fig. 2 and the workpieces are thus discharged upon the forward reaches of the conveyer bars. This loading operation can be effected either while the bars are in motion or at a standstill. Motor 58 is set to drive the conveyer mechanism in the proper direction to have the bars convey or feed the workpieces away from the door opening and inwardly toward the upwardly curving portions of the bars. The door 125 is closed; the blasting wheel 21 started and chute 61 conditioned to discharge abrasive to the center of the blasting wheel W, whereupon the blasting wheel projects a cone-shaped blast of abrasive downwardly upon the workpieces as the same are being moved by the conveyer bars and as the workpieces pile up and tumble or cascade backwardly over the pile. This cleaning and agitating action is continued until such time as it is determined that the workpieces have all of the surfaces thereof cleaned to the desired degree. The abrasive particles move downwardly through the pile of workpieces due to the constant agitation thereof and fall between the bars to hopper 65, from whence the abrasive is shifted to the conveyer elevator loading wall and carried by the conveyer buckets upwardly to be discharged into a storage hopper at the top of the cleaning mechanism.

When it is desired to unload the cleaned workpieces from the apparatus the action of the blasting wheel is arrested, the loading door is opened, the tumbling conveyer driving motor 58 is reversed and the conveying action of the bars upon the workpieces is likewise reversed, thus moving the workpieces toward the unloading door, through which the workpieces will be discharged and fall into a bin B disposed beneath the forward ends of the bars and beneath the skip hoist rails 88.

It will be apparent that while I have disclosed the cam members as being true eccentrics relative to the supporting shafts 38 and 39 and also that I have disclosed the conveying bed as comprising three sets of bars, nevertheless various cam shapes may be utilized, as well as additional sets of bars, and the extent of the throw of the cams can be varied, all of which will be determined by the peculiarities of surface shape and body structure of the workpieces to be treated, either in a blasting mill or in apparatus directed to the fulfillment of other functions.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A tumbling conveyer mechanism comprising sets of generally curvilinearly formed bars having vertically extending sections, the bars of each set being adapted to be moved both vertically and horizontally in unison and each set of bars being adapted to be moved relative to the other sets of bars and means for imparting an oscillating motion to each of said sets of bars relative to the other sets of bars and in a direction transverse to a tangent of the curvilinear sections of the bars.

2. A tumbling conveyer mechanism comprising sets of generally curvilinearly formed bars having vertically extending sections and arranged with the bars of each set disposed between the bars of the other sets and each set of bars being adapted to be moved relative to the other sets of bars and means for imparting an oscillating motion to each of said sets of bars relative to the other sets of bars and in a direction transverse to a tangent of the curvilinear sections of the bars.

3. A tumbling conveyer mechanism comprising sets of generally curvilinearly formed bars having vertically extending sections and supported adjacent the ends thereof by rotatable shafts, the bars of each set being adapted to be moved in unison by cam members driven by said rotatable shafts in a direction transverse to a tangent of the curvilinear sections of the bars, and means for driving said shafts in unison.

4. A tumbling conveyer mechanism comprising sets of bars having generally vertically extending curvilinearly formed portions and substantially horizontally extending portions, the bars of each set being adapted to be moved in unison and each set of bars being adapted to be moved relative to the other set of bars and means for imparting an oscillating motion to each of said sets of bars in timed relation to the movements of the other sets of bars and in a direction transverse to a tangent of the curvilinear sections of the bars.

5. A tumbling conveyer mechanism having in combination sets of work conveying and tumbling bars having generally substantially vertical and horizontal portions, the bars of each set extending in parallelism and spaced apart and disposed between the bars comprising the other sets, means acting on each set of bars for imparting an oscillating motion to the bars of that set and in a direction transverse to a tangent of the curvilinear sections of the bars and means for imparting a like motion to the other sets of bars so that the motion of each set of bars is sequential to the motions of the other sets of bars.

6. A tumbling conveyer mechanism having in combination parallel sets of work conveying and tumbling bars, the bars of each set being shaped to extend in a substantially horizontal and a vertical direction, means serving to support the bars and acting on each set of bars for imparting relative motions to the sets of bars whereby the bars when acting in unison form a workpiece conveyer, said means for imparting motion to the sets of bars being reversible in its bar actuating function so that the motion of each set of bars may be reversed, and means for driving said bar actuating means.

7. A tumbling conveyer mechanism comprising series of curvilinearly formed oscillatable bar shaped members which in the aggregate form a workpiece supporting bed, means for imparting movements to each of the members in such manner that relative movement takes place between adjacent bars and whereby the work supporting surface of said bed has a generally undulating movement tending to progress workpieces in a direction along the bars and means for reversing the bar actuating means whereby the progressive movement of the workpieces may be changed to a reverse direction.

8. A tumbling conveyer mechanism comprising series of movable bar shaped members which in the aggregate form a workpiece supporting bed, series of cams for imparting movements to each of the members in such manner that relative movement takes place between adjacent bars and whereby the work supporting surface of said bed has a generally undulating movement tending to progress workpieces in a direction along the bars and means for reversing the direction of rotation of the bar actuating cams whereby the progressive movement of the workpieces may be changed to a reverse direction.

9. A tumbling conveyer mechanism comprising series of movable bar shaped members which in the aggregate form a workpiece supporting bed, rotating means for imparting movements to each of the members in such manner that relative movement takes place between adjacent bars and whereby the work supporting surface of said bed has a generally undulating movement tending to progress workpieces in a direction along the bars and means for reversing the direction of rotation of the bar actuating means whereby the progressive movement of the workpieces may be changed to a reverse direction.

10. A tumbling conveyer mechanism comprising series of movable bar shaped members which in the aggregate form a workpiece supporting bed, rotating means in the form of series of cams, means for imparting movements to each of the members while supporting the members so that relative movement takes place between adjacent bars in a sequential manner whereby the work supporting surface of said bed has a generally undulating movement tending to progress workpieces in a direction along the bars and means for reversing the direction of rotation of the bar actuating cams whereby the progressive movement of workpieces resting upon the bed may be changed to a reverse direction.

11. A tumbling conveyer mechanism comprising, a plurality of elements forming a conveyer each having a generally curved, vertically extending section; and means for oscillating said elements in a direction transverse to the tangent of said curved section for imparting a tumbling action to articles on the conveyer bed.

EDWIN W. BEREIT.